May 5, 1970 — R. GILBERT ET AL — 3,509,627
UTILITY KNIFE
Filed Dec. 6, 1967
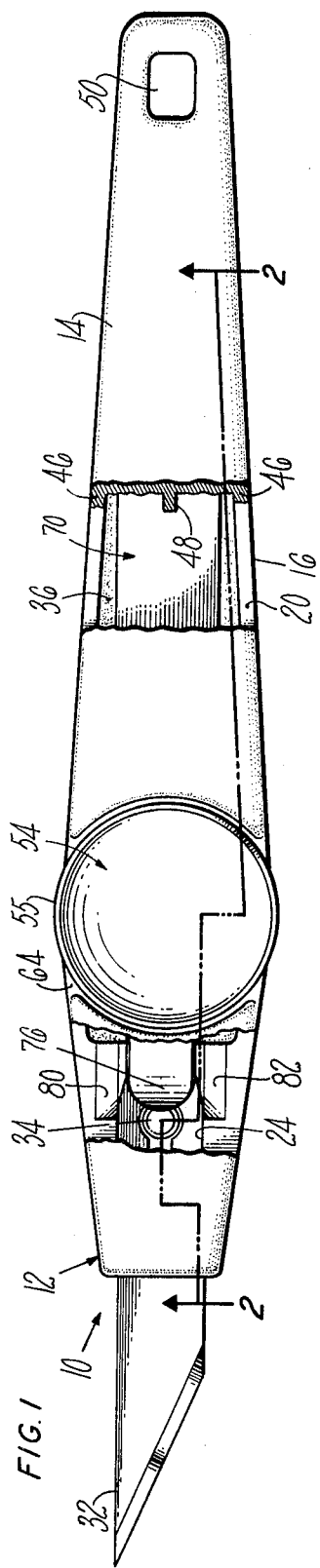
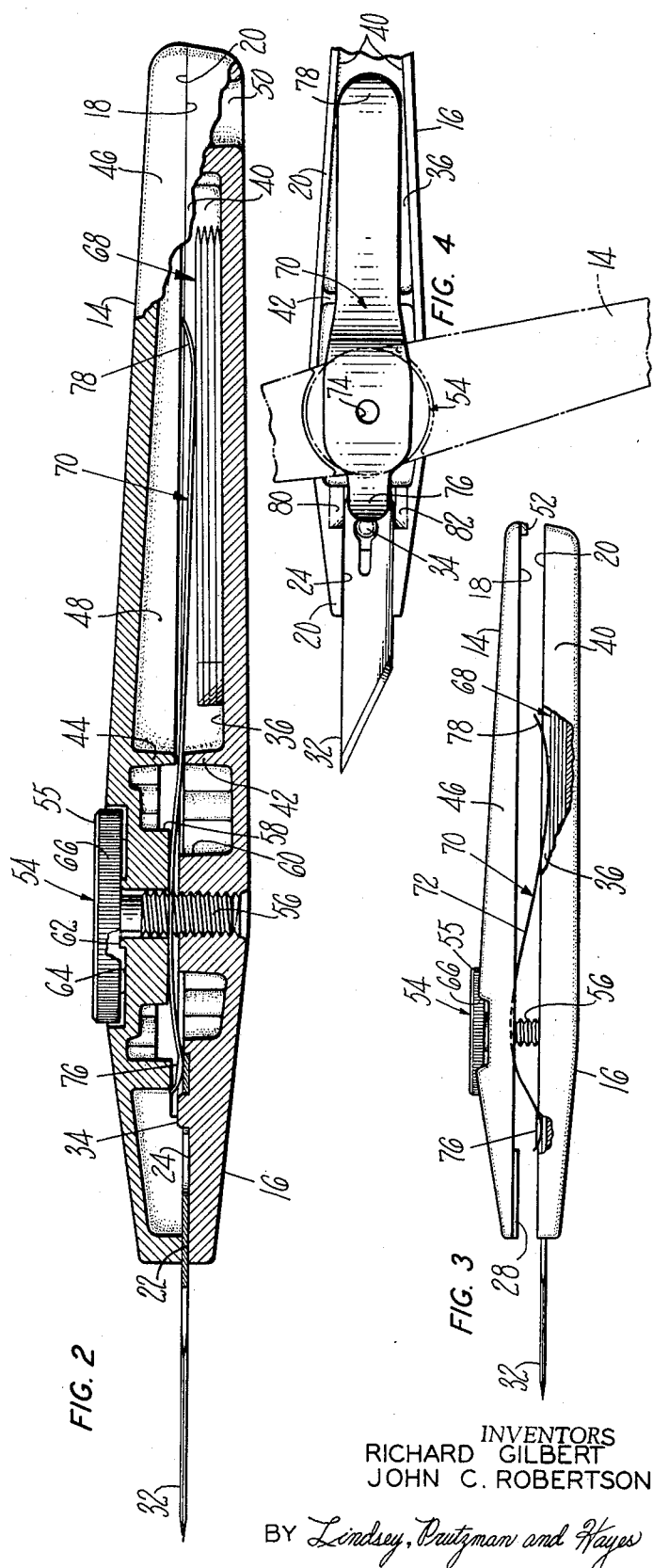
INVENTORS
RICHARD GILBERT
JOHN C. ROBERTSON
BY *Lindsey, Prutzman and Hayes*
ATTORNEYS

United States Patent Office 3,509,627
Patented May 5, 1970

3,509,627
UTILITY KNIFE
Richard Gilbert, Dronfield, Sheffield, England, and John C. Robertson, East Berlin, Conn., assignors to The Stanley Works, New Britain, Conn., a corporation of Connecticut
Filed Dec. 6, 1967, Ser. No. 688,565
Int. Cl. B25g 1/08; B26b 5/00
U.S. Cl. 30—125                              9 Claims

ABSTRACT OF THE DISCLOSURE

A knife including releasably secured handle parts having internal blade clamping and blade storage compartments, and an elongated spring clip mounted inside the handle and having blade retaining portions respectively disposed in the blade clamping and blade storage compartments and biased in a lateral direction toward one of the handle parts.

---

This invention generally relates to knives and particularly concerns a utility knife of a type used by craftsmen.

A primary object of this invention is to provide an improved knife having separable handle halves and which is particularly suited to maintain continuous control over a blade disposed in cutting position as well as over reserve blades housed within the handle, irrespective of whether the handle halves are closed or open.

Another object of this invention is to provide a knife of the above described type particularly suited for facile blade removal and replacement.

A further object of this invention is to provide a knife effecting significantly improved protection of reserve blades housed within its handle.

Still another object of this invention is to provide an improved knife having an attractive appearance and a simplified, durable construction that is economical to manufacture and assemble.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a top view, partly broken away and partly in section, showing a preferred embodiment of a knife incorporating the present invention in locked assembly;

FIG. 2 is a section view, partly broken away, taken generally along line 2—2 of FIG. 1;

FIG. 3 is a side view, partly broken away and partly in section, similar to FIG. 2 but on a reduced scale and showing the knife in unlocked assembly; and FIG. 4 is a top view, partly broken away and partly in phantom, showing the knife on a reduced scale with its handle parts in angularly displaced unlocked assembly.

Referring now to the drawing in detail, a utility knife 10 is illustrated having a substantially hollow elongated handle 12 preferably formed of a pair of mating die cast aluminum handle parts or halves 14 and 16. The handle halves 14 and 16 respectively have peripheral shoulders 18 and 20, upon being assembled in abutting face-to-face relation, lie in a longitudinal plane generally extending axially of the handle 12 and rearwardly from a blade receiving slotted opening 22 in its forward end.

A forward blade clamping compartment 24 is formed to extend rearwardly in handle half 16 from the opening 22, and a complementary projection 28 is formed on handle half 14, whereby a shank of a blade 32 disposed in compartment 24 is rigidly clamped to provide it lateral bearing support in cutting position wherein its cutting edge projects outwardly beyond the forward end of the handle 12. The blade 32 is desirably fixed against longitudinal movement by a stud 34 projecting from the blade clamping compartment 24 toward handle half 14 to register with a suitable opening in the shank of blade 32.

A blade storage compartment 36 is conveniently formed in a rear portion of handle half 16 for housing extra blades for replacement purposes and is in part surrounded by peripheral side walls 40 of the handle half 16 and an internal transverse web 42 extending between the side walls 40. The web 42 is in spaced alignment with an internal web 44 transversely extending across peripheral side walls 46 of handle half 14. The latter is shown having a longitudinal rib 48 extending rearwardly from web 44 intermediate the peripheral side walls 46.

To hold the knife 10 when not in use, the handle halves 14, 16 are formed with aligned apertures defining an opening 50 in the rear end portion of the handle 12 for hanging it upon a hook or, e.g., providing it with a supporting ring, not shown.

The rear end of handle half 14 is also shown having a projecting ear 52 which fits into a conforming recess, not shown, in the other handle half 16. Such construction in conjunction with the above described shoulder and recess arrangement on the forward end portion of the handle 12 ensures proper fitting of its halves 14, 16 in a dimensionally stable assembly.

Facile assembly and disassembly of the separable handle halves 14, 16 is effected by provision of a thumb screw 54 having a head 55 and a threaded stem 56 which extends through a pair of axially aligned bosses 58 and 60 formed on interior portions of handle halves 14 and 16 adjacent the forward end of the handle 12 between the blade clamping and blade storage compartments 24, 36. The bosses 58, 60 are spaced apart a predetermined distance when the handle halves 14, 16 are forced into tightly closed position with their peripheral shoulders 18, 20 in intimate contact (FIG. 2) upon firmly drawing up the thumb screw 54 to provide a locked assembly with the blade 32 rigidly clamped in operative cutting position. With the handle halves 14, 16 in closed position, the stem 56 of thumb screw 54 is shown threadedly engaging handle half 16, and head 55 bottoms against a raised shoulder 62 projecting into a recess 64 formed in the handle 14 for receiving the head 55 which preserves a streamlined handle appearance and also assures a comfortable grip during extended use. The head 55 is of enlarged diameter slightly greater than the major width of the handle 12 such that diametrically opposed portions of its knurled edge 66 are quickly and easily rotated under thumb pressure to lock and release the handle halves 14, 16.

To maintain continuous control over the blade in the blade clamping compartment 24, as well as over any additional blades such as the stack of blades shown disposed within the blade storage compartment at 68, a spring clip 70 is mounted inside the handle 12 to press the blades against the floor of the handle half 16 and effectively control the blades even upon separating the handle halves 14, 16 when the thumb screw 54 is released.

More specifically, the spring clip 70 is formed of a suitable thin flat strip of rugged, resilient material such as spring steel and is of elongated configuration having an arcuate intermediate part 72 bowed toward handle half 14 with a longitudinal curvature progressively diminishing toward opposite end portions of the clip 70. The clip 70 is suitably dimensioned to fit between the handle halves 14, 16 and the bowed intermediate part 72 is apertured to provide an opening 74 for receiving the stem 56 of the thumb screw 54. Longitudinal shifting of the clip 70 relative to the handle 12 is thus prevented while yet permitting the clip to be readily rotated upon releasing the thumb screw 54 and angularly displacing one of the handle halves 14, 16 relative to the other whereby they are in angularly displaced unlocked assembly as seen in FIG. 4 with the blade clamping and blade storage compartments 24, 36 exposed.

With the handle 12 in unlocked assembly, the inherent resiliency of the spring clip 70 biases the handle halves 14, 16 in opposite lateral directions, and the bowed intermediate part 72 of the clip 70 engages the boss 58 to constrain unintended relative swinging movements of the handle halves 14, 16 about the thumb screw stem 56. At the same time the blades are firmly pressed against the handle half 16 by the opposite end portions of the clip 70 preventing the blades from being accidentally displaced or spilled out, irrespective of the attitude of the handle 12.

In the specific illustrated embodiment, the opposite end portions of the spring clip 70 are reversely turned or curved to provide a forward tab 76 of disk shaped configuration at the forward end portion of the clip 70 and a finger tab 78 at the rear end portion of the clip 70, the tabs 76, 78 having raised ends facilitating blade removal and replacement. The raised end of the finger tab 78 readily accommodates insertion of blades in the storage compartment 36 between the finger tab 78 and the floor of the handle half 16 and is quickly and easily grasped when it is desired to swing the spring clip 70 relative to the handle halves 14, 16 to completely expose the blade clamping and storage compartments 24, 36 at forward and rear portions of the handle half 16.

By the provision of laterally extending beveled surfaces 80, 82 in continuation with opposite sides of the blade clamping compartment 24, the disk shaped forward tab 76 smoothly rides over the adjoining peripheral shoulders 20 upon swinging the spring clip 70 about the thumb screw stem 55 relative to the handle half 16.

Thus, it will be seen that removal and replacement of the blade 32 in the cutting position may be readily accomplished with the spring clip 70 in axially aligned position within handle half 16 or when they are angularly displaced to obtain free access to the blades within the blade storage compartment 36.

With the spring clip 70 positioned within handle half 16, the other handle half 14 may then be swung back into aligned position and thumb screw 54 turned down to firmly secure a newly selected blade in its operative cutting position. The spring clip 70 will then be deflected from its normal free height (FIG. 3) by the boss 58 to apply an increased force on the blade 32 in cutting position as well as on the stack 68 of blades being stored in the blade storage recess 36, the above described spacing between the bosses 58, 60 and the webs 42, 44 being sufficient to prevent interference with the spring clip 70.

Moreover, with the handle halves 14, 16 once again in locked assembly (FIG. 2), an additional holding force of increased magnitude is exerted on the stack 68 of blades by the longitudinal rib 48 which engages the raised end of finger tab 78 to ensure its being seated in direct pressing engagement with the uppermost blade of the stack 68.

Thus, it will be seen that a knife constructed in accordance with the present invention readily provides an exceptionally compact, unitary handle of pleasing appearance while at the same time significantly facilitating interchange of blades between the blade clamping and storage compartments while also retaining the blades against unintended displacement when the handle halves are opened. In addition, the amplified blade holding force applied by the spring clip wih the handle in locked assembly significantly minimizes any possibility of the replacement blades rattling about within the storage compartment and possibily damaging the cutting edges of the replacement blades.

As will be apparent to persons skilled in the art, various modifications and adaptations of the structure above-described will become readily apparent without departure from the spirit and scope of the invention, the scope of which is defined in the appended claims.

The embodiments of the invention in which an exclusive property or privilege is claimed are defined as follows:

1. A blade holder comprising a separable pair of elongated mating handle parts, means releasably connecting the handle parts for manipulation between a closed position with the handle parts in abutment and on open position with the handle parts in unlocked assembly, one of the handle parts having an internal blade storage compartment and an internal blade clamping compartment and a spring clip disposed between the handle parts and maintained in assembled relation therewith by the connecting means, the spring clip having blade retaining portions respectively received in the blade storage compartment and the blade clamping compartment for exerting a blade holding force laterally directed toward said one handle part in both closed and open positions.

2. The blade holder of claim 1 wherein the connecting means comprises a locking screw extending laterally of the holder for releasably locking the separable handle parts in abutting engagement, the screw extending through an intermediate portion of the spring clip and constituting a common axis supporting the handle parts and the spring clip for relative angular movement when the screw is loosened to manipulate the handle parts between closed and open positions.

3. The blade holder of claim 1 wherein the intermediate portion of the spring clip is bowed and spaced apart from said one handle part and directly engaged with the other handle part for continuously urging the handle parts in opposite lateral directions and effecting continuous control over the handle parts and blades while resisting unintended movement thereof upon releasing the connecting means and opening the holder.

4. The blade holder of claim 1 wherein the spring clip has a forward end portion received in the blade clamping compartment and which is of disk shaped configuration, and wherein interior portions of said one handle part are tapered inwardly toward opposite sides of the blade clamping compartment to provide beveled surfaces in continuation therewith for facilitating pivotal movement of the spring clip relative to said one handle part.

5. The blade holder of claim 2 wherein the locking screw includes an enlarged head positioned externally of the holder and having diametrically opposed edge portions projecting beyond peripheral surfaces of the holder for improved manual manipulability.

6. The blade holder of claim 3 wherein the blade storage and blade clamping compartments are disposed on opposite sides of the locking screw, and wherein the curvature of the bowed intermediate portion of the spring clip progressively diminishes toward opposite end portions thereof, the opposite end portions constituting said blade retaining portions of the spring clip.

7. The blade holder of claim 6 wherein the opposite end portions of the spring clip are each reversely curved to provide the same with raised ends facilitating blade removal and replacement.

8. The blade holder of claim 7 wherein the raised end of the spring clip received in the blade storage compartment engages said other of the handle parts when they are in closed position to apply a blade clamping force of amplified magnitude relative to that exerted when the handle parts are in open position.

9. A knife comprising a handle having a forward end with a slotted opening therein, the handle including a pair of elongated mating handle parts separable along a longitudinal plane extending generally parallel to the slotted opening, one of the handle parts having an internal blade clamping compartment communicating with the slotted opening and an internal blade storage compartment disposed rearwardly of the blade clamping compartment, a blade received in the blade clamping compartment to project outwardly through the slotted opening in cutting position, an additional blade received within the blade storage compartment, an elongated flat spring clip disposed between the handle parts and having opposite end portions in direct pressing engagement against the blades in the blade clamping and blade storage compartments respectively, the spring clip including an apertured intermediate portion, and a locking screw releasably securing the handle parts in locked assembly and extending transversely thereof through the apertured intermediate portion of the spring clip in perpendicular relation to said longitudinal plane and constituting a common axis supporting the handle parts and the spring clip for relative angular movement when the screw is loosened while retaining the handle parts in unlocked assembly, whereby the spring clip provides continuous control over the blades when the blade clamping and blade storage compartments are exposed upon relative angular displacement of the handle parts.

References Cited

UNITED STATES PATENTS

| | | | |
|---|---|---|---|
| 1,756,439 | 4/1930 | Schick | 30—86 |
| 2,172,072 | 9/1939 | Rothschild | 30—162 |
| 2,548,797 | 4/1951 | Ingwer et al. | 30—162 |
| 2,577,056 | 12/1951 | Whipple et al. | 30—162 |

FOREIGN PATENTS

| | | |
|---|---|---|
| 1,218,889 | 5/1960 | France. |
| 932,055 | 7/1963 | Great Britain. |

GIL WEIDENFELD, Primary Examiner

U.S. Cl. X.R.

30—332